Jan. 23, 1940.                    R. L. FURBY                    2,188,040
                          AUTOMATIC LIQUID PROPORTIONER
                              Filed April 8, 1939          2 Sheets-Sheet 1

Inventor
R. L. Furby
By Clarence A. O'Brien
and Hyman Berman
Attorneys

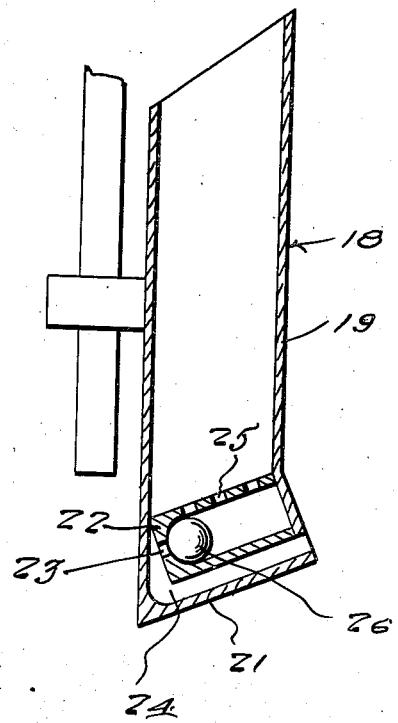
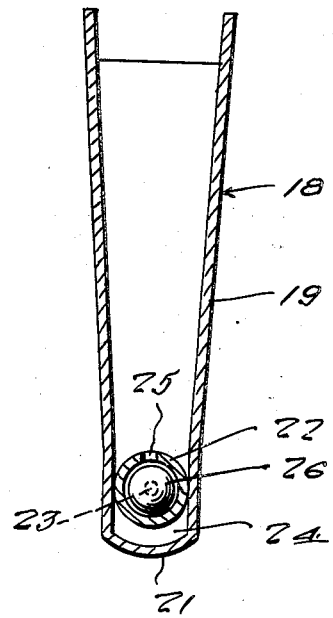

Patented Jan. 23, 1940

2,188,040

UNITED STATES PATENT OFFICE 2,188,040

AUTOMATIC LIQUID PROPORTIONER

Robert L. Furby, Oswego, Oreg.

Application April 8, 1939, Serial No. 266,922

4 Claims. (Cl. 221—96)

The present invention relates to new and useful improvements in means whereby one or more substances can be automatically added to another premeasured substance at the exact proportion required.

An important object of the invention is to provide a substance adding apparatus for automatically adding a substance to a second substance in the proper portion to the amount of the second substance, without any exacting effort and very little human attention on the part of the attendants.

These and other object and advantages of the invention will become apparent to the reader of the following specification.

In the drawings:

Figure 2 is a sectional view longitudinally through the dump receptacle.

Figure 3 is a fragmentary sectional view through the dip receptacle.

Figure 4 is a section through Figure 3.

Figure 1:
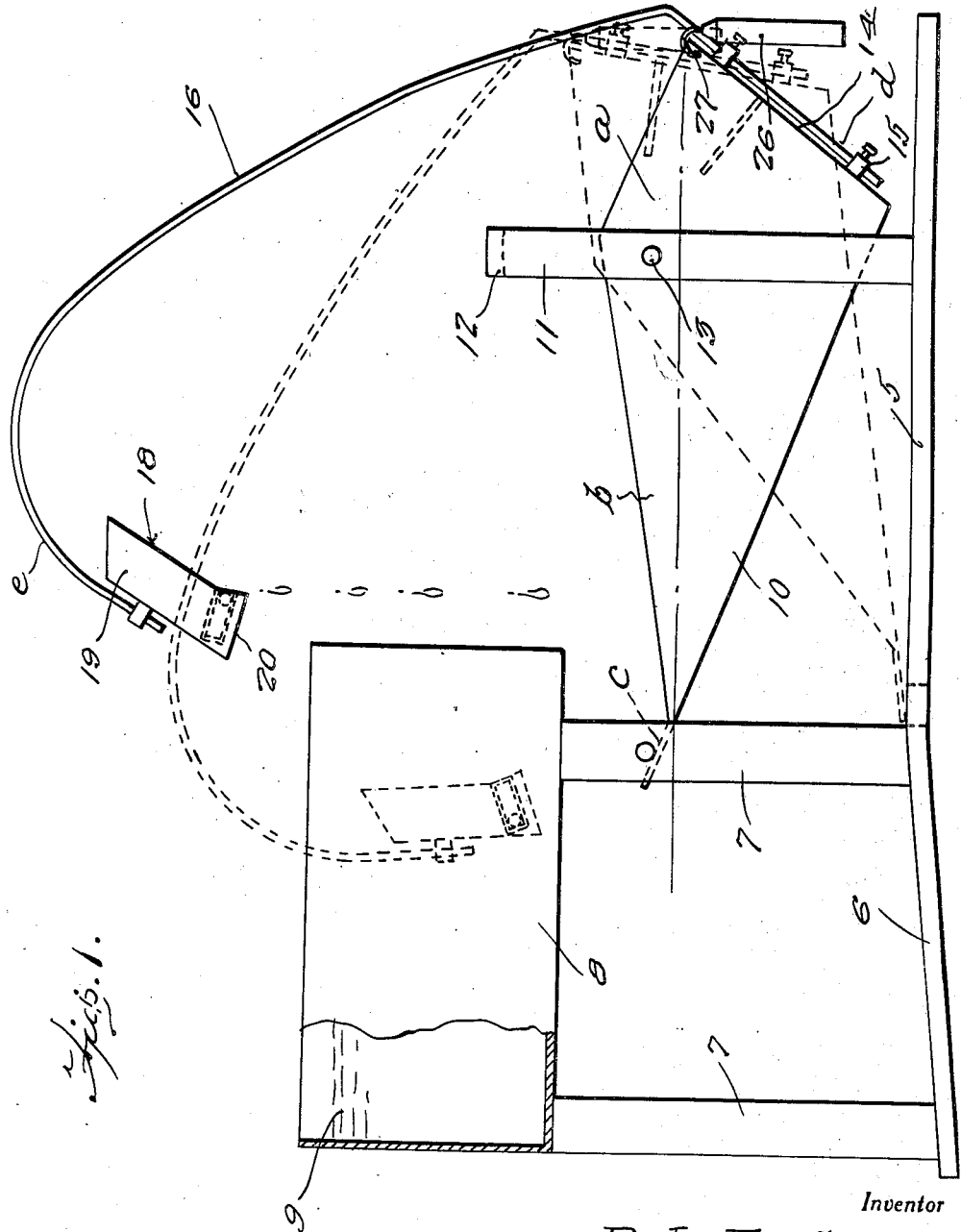
Figure 1 is a side elevational view of the apparatus with a portion broken away and showing the liquid adding receptacle in elevated position and about ready to discharge its contents.

Referring to the drawings wherein like numerals designate like parts, it can be seen that the numeral 5 represents the base from which extends the inclined chute 6. Rising from the chute 6 are the uprights 7 for supporting the tank 8, the latter containing the substance 9 which is to be added in the proper proportion to the contents of the dump receptacle 10. Such contents is fed by a suitable means (not shown) to the dump receptacle 10.

A pair of posts 11 rise from the base 5 and are bridged at their upper ends as at 12. A cross bar 13 extends between the posts 11 and has its ends connected thereto, and this bar extends through the side walls a—a of the dump receptacle 10.

The side walls a—a taper downwardly as at b to the extended bottom portion c. The function of the dump receptacle 10 is that when the same becomes filled it will overbalance in the direction of the bottom extension c and permit its contents to slide out and down the chute 6.

On the back wall 14 on the receptacle 10 are the guides 15 for receiving the lower portion d of the elongated rod 16 which, at its receptacle carrying end, has a downwardly extending curved portion e. The receptacle for dipping substance from the tank 8 is generally referred to by the numeral 18, and consists of the narrow elongated container 19 which has a sloping bottom 21. As shown in Figure 3, above the inclined bottom 21 and in spaced relation therewith is the hollow partition structure 22, one end of which is formed with the discharge opening 23 communicating the interior of the partition 22 with the passageway 24, and as shown in Figure 3, the top of the partition 22 is formed with openings 25 which communicate the interior of the receptacle 19 with the interior of the partition 22. The partition 22 is inclined as shown in Figure 3 so that the ball valve 26 will be in partition closing position when the receptacle 19 is in upright position.

When the receptacle 10 is empty, the dip receptacle 19 is submerged in the substance 9 of the tank 8, the supply in which can be controlled by automatic means. When the tank 10 has returned to its receiving position as shown in Figure 1, ready to receive another volume of substance from a source not shown, the movement of the arm 16 will result in the lifting of the dip receptacle 18 from the tank 8, and as it moves over the tapered end of the receptacle 10, it starts to tilt so that its ball 26 will move away from the port 23 and allow the contents of the dip receptacle 18 to discharge through the opening 23 and passageway 24 to the receptacle 10.

When the receptacle 10 is substantially full, it will overbalance to the dotted line position in Figure 1.

A weight or weights 26 having hook members 27 can be applied to the back wall 14 of the trough or receptacle 10 to act as counterbalancing means therefor, and particularly to return the receptacle to the position shown in Figure 1, when substantially empty, at which time the lip c is abutting the cross bar 25 between the legs 7 adjacent the receptacle 10.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is—

1. A substance proportioner comprising a tank for containing a substance, a rockable dump receptacle mounted adjacent the tank and adapted to be overbalanced under the weight of a predetermined load, an elongated arm extending from the dump receptacle and having a receptacle on the free end thereof adapted to dip into the tank when the dump receptacle is in discharging position and to overlie the dump receptacle and discharge its contents when the dump receptacle is in charging position.

2. A substance proportioner comprising a tank for containing a substance, a rockable dump receptacle mounted adjacent the tank and adapted to be overbalanced under the weight of a predetermined load, an elongated arm extending from the dump receptacle and having a receptacle on the free end thereof adapted to dip into the tank when the dump receptacle is in discharging position and to overlie the dump receptacle and discharge its contents when the dump receptacle is in charging position, and counterbalancing means for the dump receptacle.

3. A substance proportioner comprising a tank for containing a substance, a rockable dump receptacle mounted adjacent the tank and adapted to be overbalanced under the weight to a predetermined load, an elongated arm extending from the dump receptacle and having a receptacle on the free end thereof adapted to dip into the tank when the dump receptacle is in discharging position and to overlie the dump receptacle and discharge its contents when the dump receptacle is in charging position, said arm carried receptacle being provided with a gravity operated check valve for releasing its contents when the same is located immediately over the rockable receptacle.

4. A substance proportioner comprising a tank for containing a substance, a rockable dump receptacle mounted adjacent the tank and adapted to be overbalanced under the weight of a predetermined load, an elongated arm extending from the dump receptacle and having a receptacle on the free end thereof adapted to dip into the tank when the dump receptacle is in discharging position and to overlie the dump receptacle and discharge its contents when the dump receptacle is in charging position, said arm carried receptacle being provided with a gravity operated check valve for releasing its contents when the same is located immediately over the rockable receptacle, said gravity operative valve consisting of a hollow partition having openings therein communicating its interior with the interior of the arm carried receptacle, said partition having a discharge port and a check valve in the partition for closing the port.

ROBERT L. FURBY.